US010641972B2

(12) United States Patent
Wong et al.

(10) Patent No.: US 10,641,972 B2
(45) Date of Patent: May 5, 2020

(54) ANTI-JAM ALIGNMENT SLEEVE HOLDER OR CONNECTOR HOUSING FOR A FERRULE ASSEMBLY

(71) Applicant: Senko Advanced Components Inc, Marlborough, MA (US)

(72) Inventors: Kim Man Wong, Kowloon (HK); Kazuyoshi Takano, Tokyo (JP)

(73) Assignee: Senko Advanced Components, Inc, Marlborough, MA (US)

( * ) Notice: Subject to any disclaimer, the term of this patent is extended or adjusted under 35 U.S.C. 154(b) by 0 days.

(21) Appl. No.: 16/036,265

(22) Filed: Jul. 16, 2018

(65) Prior Publication Data

US 2019/0056557 A1 Feb. 21, 2019

Related U.S. Application Data

(60) Provisional application No. 62/581,961, filed on Nov. 6, 2017, provisional application No. 62/546,920, filed on Aug. 17, 2017.

(51) Int. Cl.
*G02B 6/36* (2006.01)
*G02B 6/38* (2006.01)
(52) U.S. Cl.
CPC ......... *G02B 6/3874* (2013.01); *G02B 6/3821* (2013.01); *G02B 6/3871* (2013.01); *G02B 6/3878* (2013.01); *G02B 6/3885* (2013.01)
(58) Field of Classification Search
CPC .. G02B 6/3874; G02B 6/3885; G02B 6/3871; G02B 6/3821
See application file for complete search history.

(56) References Cited

U.S. PATENT DOCUMENTS

| 4,150,790 | A | 4/1979 | Potter |
| 4,312,564 | A | 1/1982 | Cefarelli et al. |
| 4,327,964 | A | 5/1982 | Haesly et al. |
| 4,478,473 | A | 10/1984 | Frear |
| 4,762,388 | A | 8/1988 | Tanaka et al. |

(Continued)

FOREIGN PATENT DOCUMENTS

| CA | 2495693 A1 | 4/2004 |
| CN | 2836038 Y | 11/2006 |

(Continued)

OTHER PUBLICATIONS

European Search Report and Written Opinion dated Mar. 3, 2015 for EP 14187661.

(Continued)

*Primary Examiner* — Ellen E Kim
(74) *Attorney, Agent, or Firm* — Edward S. Jarmolowicz, Esq.

(57) ABSTRACT

Embodiments disclosed herein are directed to a device and system of devices including: a connector housing comprising an alignment sleeve therein with a plural of angled surface and at least one opening, or an internal cavity of said connector housing has the same configuration as said alignment sleeve. Upon inserting ferrule assembly within an opening of said housing, a contact point on a collar or flange of said assembly moves along angled surfaces until it engages an opening between angled surfaces for securing ferrule assembly within connector housing without jamming.

8 Claims, 10 Drawing Sheets

(56) References Cited

U.S. PATENT DOCUMENTS

| | | | |
|---|---|---|---|
| 4,764,129 A | 8/1988 | Jones et al. |
| 4,840,451 A | 6/1989 | Sampson et al. |
| 4,872,736 A | 10/1989 | Myers et al. |
| 4,979,792 A | 12/1990 | Weber et al. |
| 5,041,025 A | 8/1991 | Haitmanek |
| D323,143 S | 1/1992 | Ohkura et al. |
| 5,212,752 A | 5/1993 | Stephenson et al. |
| 5,265,181 A | 11/1993 | Chang |
| 5,289,554 A | 2/1994 | Cubukciyan et al. |
| 5,317,663 A | 5/1994 | Beard et al. |
| 5,335,301 A | 5/1994 | Newman et al. |
| 5,348,487 A | 9/1994 | Marazzi et al. |
| 5,444,806 A * | 8/1995 | de Marchi ........... G02B 6/3825 385/75 |
| 5,481,634 A | 1/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,692,090 A * | 11/1997 | Szegda ................ G02B 6/3887 385/139 |
| 5,781,681 A | 7/1998 | Manning |
| 5,845,036 A | 12/1998 | De Marchi |
| 5,920,669 A * | 7/1999 | Knecht ................ G02B 6/3825 385/138 |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,134,370 A | 10/2000 | Childers et al. |
| 6,151,432 A | 11/2000 | Nakajima |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,276,840 B1 | 8/2001 | Weiss et al. |
| 6,347,888 B1 | 2/2002 | Puetz |
| 6,364,537 B1 | 4/2002 | Maynard |
| 6,367,984 B1 | 4/2002 | Stephenson et al. |
| 6,461,054 B1 | 10/2002 | Iwase |
| 6,471,412 B1 | 10/2002 | Belenkiy et al. |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,668,113 B2 | 12/2003 | Togami et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,811,321 B1 | 11/2004 | Schmalzigaug et al. |
| 6,854,894 B1 | 2/2005 | Yunker et al. |
| 6,872,039 B2 | 3/2005 | Baus et al. |
| 6,891,735 B2 | 5/2005 | Hultermans et al. |
| 6,935,789 B2 | 8/2005 | Gross, III et al. |
| 7,052,186 B1 | 5/2006 | Bates |
| 7,091,421 B2 | 5/2006 | Kukita et al. |
| 7,090,406 B2 | 8/2006 | Melton et al. |
| 7,090,407 B2 | 8/2006 | Melton et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,281,859 B2 | 10/2007 | Mudd et al. |
| 7,283,718 B2 | 10/2007 | Zaina et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmell et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,473,124 B1 | 1/2009 | Briant et al. |
| 7,510,335 B1 * | 3/2009 | Su ........................ G02B 6/3869 385/60 |
| 7,513,695 B1 | 4/2009 | Lin et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| D641,708 S | 7/2011 | Yamauchi |
| 8,186,890 B2 | 5/2012 | Lu |
| 8,192,091 B2 | 6/2012 | Hsu et al. |
| 8,202,009 B2 | 6/2012 | Lin et al. |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,636,424 B2 | 1/2014 | Kuffel et al. |
| 8,651,749 B2 | 2/2014 | Dainese Junior et al. |
| 8,770,863 B2 | 7/2014 | Cooke et al. |
| 9,411,110 B2 | 8/2016 | Barnette et al. |
| 9,494,744 B2 | 11/2016 | de Jong |
| 9,494,745 B2 * | 11/2016 | Iizumi ................... G02B 6/3887 |
| 9,548,557 B2 | 1/2017 | Liu |
| 9,551,842 B2 | 1/2017 | Theuerkorn |
| 9,568,686 B2 | 2/2017 | Fewkes et al. |
| 9,581,768 B1 | 2/2017 | Baca et al. |
| 9,658,407 B2 | 5/2017 | Volker et al. |
| 9,684,313 B2 | 6/2017 | Cline et al. |
| 9,709,753 B1 | 7/2017 | Chang et al. |
| 10,067,300 B2 * | 9/2018 | Katagiyama ............ G02B 6/36 |
| 2002/0172467 A1 | 11/2002 | Anderson et al. |
| 2003/0053787 A1 | 3/2003 | Lee |
| 2003/0063862 A1 | 4/2003 | Fillion et al. |
| 2003/0142919 A1 * | 7/2003 | Zimmel ................ G02B 6/3843 385/78 |
| 2003/0157825 A1 | 8/2003 | Kane |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2005/0111796 A1 | 5/2005 | Matasek et al. |
| 2005/0141817 A1 | 6/2005 | Yazaki et al. |
| 2006/0088247 A1 * | 4/2006 | Tran ..................... G02B 6/3874 385/55 |
| 2006/0089049 A1 | 4/2006 | Sedor |
| 2006/0127025 A1 | 6/2006 | Haberman |
| 2006/0140543 A1 | 6/2006 | Abendschein et al. |
| 2006/0160429 A1 | 7/2006 | Dawiedczyk et al. |
| 2006/0269194 A1 | 11/2006 | Luther et al. |
| 2006/0274411 A1 | 12/2006 | Yamauchi |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0232115 A1 | 10/2007 | Burke et al. |
| 2007/0243749 A1 | 10/2007 | Wu |
| 2008/0008430 A1 | 1/2008 | Kewitsch |

(56) References Cited

U.S. PATENT DOCUMENTS

| | | |
|---|---|---|
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | Lin et al. |
| 2009/0022457 A1 | 1/2009 | De Jong et al. |
| 2009/0028507 A1 | 1/2009 | Jones et al. |
| 2009/0092360 A1 | 4/2009 | Lin et al. |
| 2009/0196555 A1 | 8/2009 | Lin et al. |
| 2009/0214162 A1 | 8/2009 | O'Riorden et al. |
| 2009/0220197 A1 | 9/2009 | Gniadek |
| 2009/0290938 A1 | 11/2009 | Lin et al. |
| 2010/0034502 A1 | 2/2010 | Lu et al. |
| 2010/0239220 A1 | 9/2010 | Lin et al. |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0058773 A1 | 3/2011 | Peterhans et al. |
| 2011/0131801 A1 | 6/2011 | Nelson et al. |
| 2011/0177710 A1 | 7/2011 | Tobey |
| 2011/0211792 A1* | 9/2011 | Koreeda ............. G02B 6/3879 385/60 |
| 2011/0267742 A1 | 11/2011 | Togami et al. |
| 2012/0099822 A1 | 4/2012 | Kuffel et al. |
| 2012/0155810 A1 | 6/2012 | Nakagawa |
| 2012/0189260 A1 | 7/2012 | Kowalczyk et al. |
| 2012/0237177 A1 | 9/2012 | Minota |
| 2012/0269485 A1 | 10/2012 | Haley et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0183012 A1 | 7/2013 | Cabanne Lopez et al. |
| 2013/0259429 A1 | 10/2013 | Czosnowski et al. |
| 2013/0322825 A1 | 12/2013 | Cooke et al. |
| 2014/0016901 A1 | 1/2014 | Lambourn et al. |
| 2014/0023322 A1 | 1/2014 | Gniadek et al. |
| 2014/0050446 A1 | 2/2014 | Chang |
| 2014/0133808 A1 | 5/2014 | Hill et al. |
| 2014/0219621 A1 | 8/2014 | Barnette et al. |
| 2014/0226946 A1 | 8/2014 | Cook et al. |
| 2014/0241678 A1 | 8/2014 | Brinquier et al. |
| 2014/0241688 A1 | 8/2014 | Isenhour et al. |
| 2014/0334780 A1 | 11/2014 | Nguyen et al. |
| 2014/0348477 A1 | 11/2014 | Chang |
| 2015/0111417 A1 | 4/2015 | Vanderwoud |
| 2015/0247977 A1* | 9/2015 | Shimakawa ......... G02B 6/3825 385/60 |
| 2015/0301294 A1 | 10/2015 | Chang |
| 2015/0355417 A1 | 10/2015 | Takano |
| 2015/0331201 A1 | 11/2015 | Takano et al. |
| 2015/0378113 A1 | 12/2015 | Good et al. |
| 2016/0172852 A1 | 6/2016 | Takano |
| 2016/0291262 A1 | 6/2016 | Chang |
| 2016/0195682 A1 | 7/2016 | Takano |
| 2016/0231512 A1 | 8/2016 | Seki |
| 2016/0259135 A1 | 9/2016 | Gniadek et al. |
| 2016/0266326 A1 | 9/2016 | Gniadek |
| 2016/0320572 A1 | 11/2016 | Gniadek |
| 2016/0131849 A1 | 12/2016 | Takano |
| 2017/0003458 A1 | 1/2017 | Gniadek |

FOREIGN PATENT DOCUMENTS

| | | |
|---|---|---|
| CN | 201383588 Y | 1/2010 |
| CN | 202600189 U | 12/2012 |
| DE | 202006011910 U1 | 4/2007 |
| DE | 102006019335 A1 | 10/2007 |
| EP | 1074868 A1 | 7/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009229545 A | 10/2009 |
| JP | 2009276493 A | 11/2009 |
| TW | 200821653 A | 5/2008 |
| WO | 2001/79904 A2 | 10/2001 |
| WO | 2004/027485 A1 | 4/2004 |
| WO | 2008/112986 A1 | 9/2008 |
| WO | 2009/135787 A1 | 11/2009 |
| WO | 2010/024851 A2 | 3/2010 |
| WO | 2012/136702 A1 | 10/2012 |
| WO | 2012/162385 A1 | 11/2012 |
| WO | 2014/028527 A1 | 2/2014 |
| WO | 2014/182351 A1 | 11/2014 |
| WO | 2015/191024 A1 | 12/2015 |
| WO | 2016/148741 A1 | 9/2016 |

OTHER PUBLICATIONS

European Search Report and Written Opinion dated Feb. 19, 2015 for EP 14168005.

"Fiber Optic Connectors and Assemblies Catalog" 2009, Huber & Suhner Fiver Optics, Herisau, Switzerland, www.hubersuhner.com.

"Fiber Optic Interconnect Solutions, Tactical Fiber Optical Connectors, Cables and Termini" 2006, Glenair, Inc., Glendale, California, www.mps-electronics.de.

"Fiber Optic Products Catalog" Nov. 2007, Tyco Electronics Corporation, Harrisburg, Pennsylvania, www.ampnetconnect.com.

International Search Report and Written Opinion dated Apr. 27, 2012 for PCT/US2011/058799.

International Search Report and Written Opinion dated Aug. 27, 2012 for PCT/US2012/039126.

International Search Report and Written Opinion dated Jan. 16, 2014 for PCT/US2013/54784.

International Search Report and Written Opinion dated Oct. 9, 2014 for PCT/US2014/041500.

International Search Report and Written Opinion dated May 14, 2014 for PCT/US2014/012137.

International Search Report and Written Opinion dated Aug. 21, 2008 for PCT/US2008/057023.

International Preliminary Report on Patentability dated Aug. 22, 2016 from related International Application No. PCT/US2015/059458, International Filing dated Nov. 6, 2015.

International Search Report (ISR) WO2008112986 dated Sep. 15, 2009.

ISR WO2014028527ISR dated Feb. 20, 2014.
ISR WO2015US57610ISR dated Jan. 21, 2016.
ISR WO2016176083ISR dated May 19, 2016.

* cited by examiner

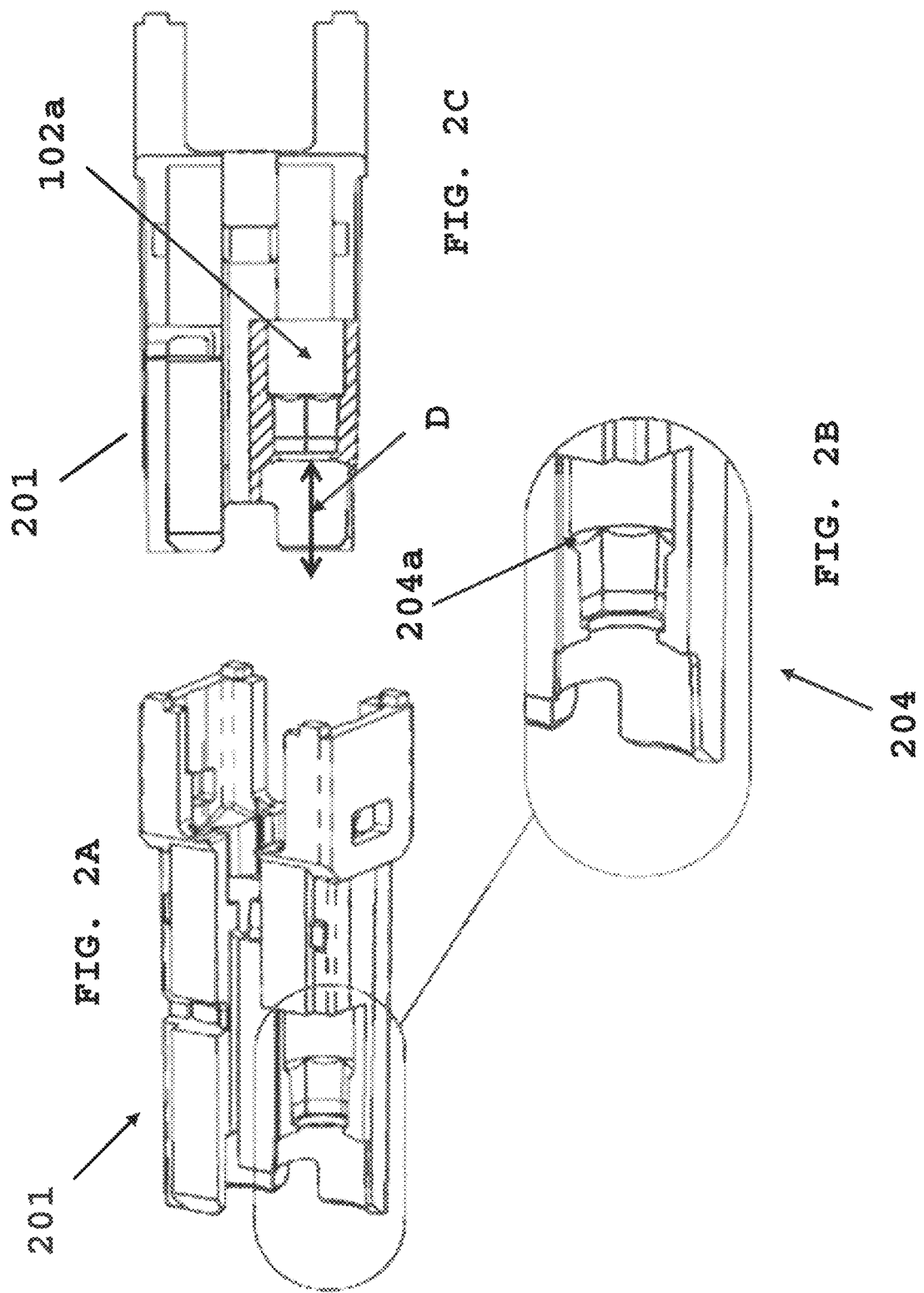

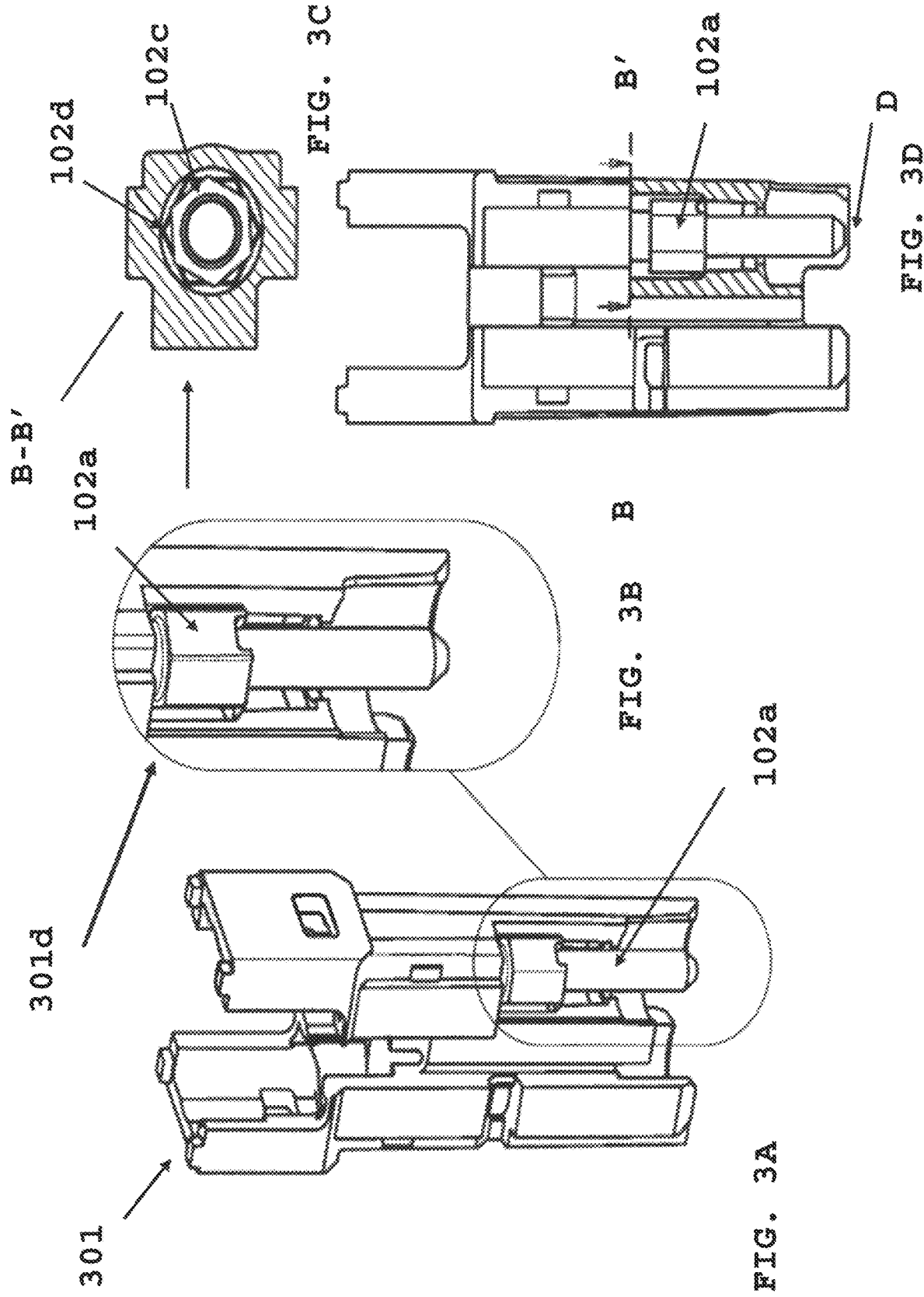

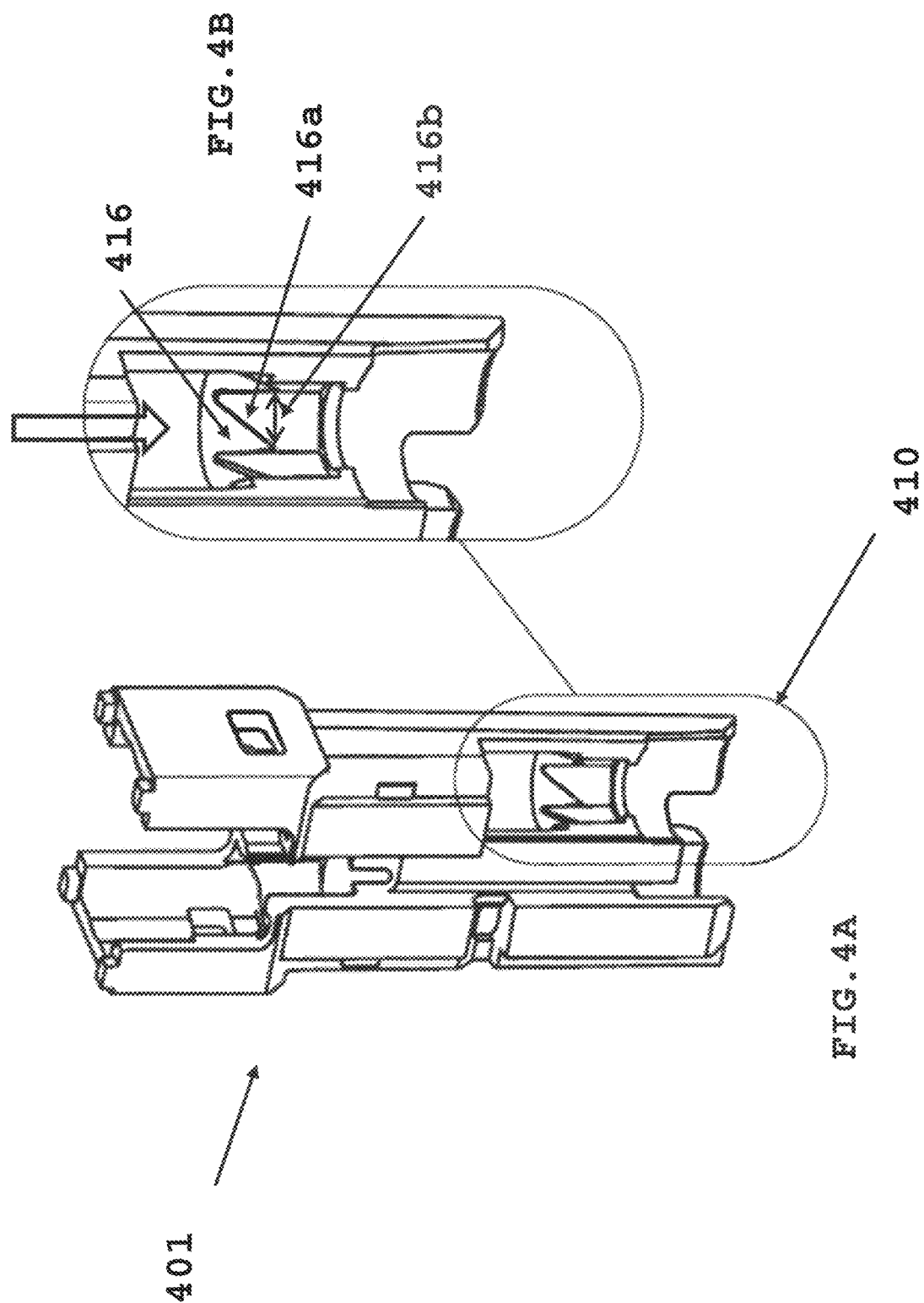

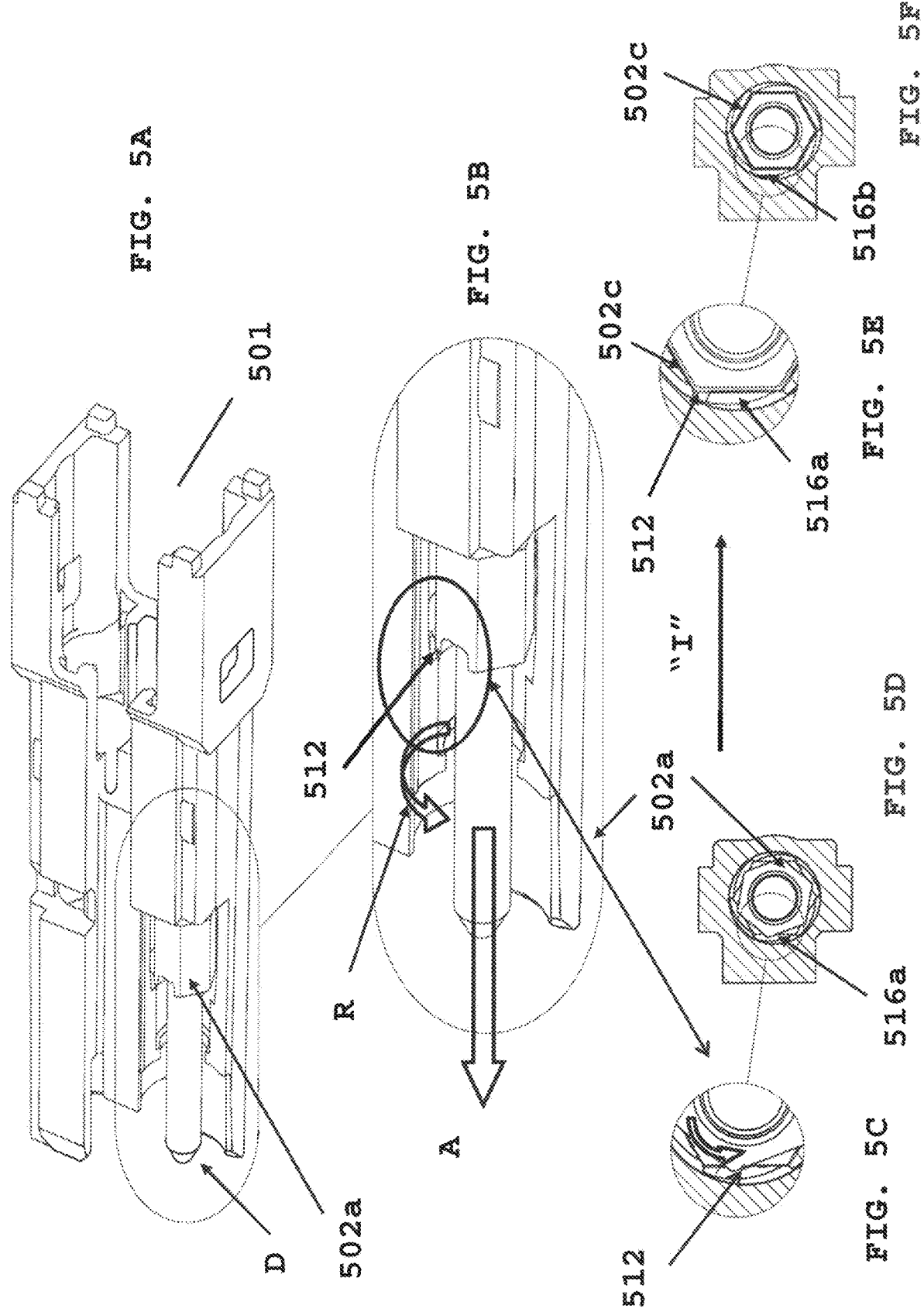

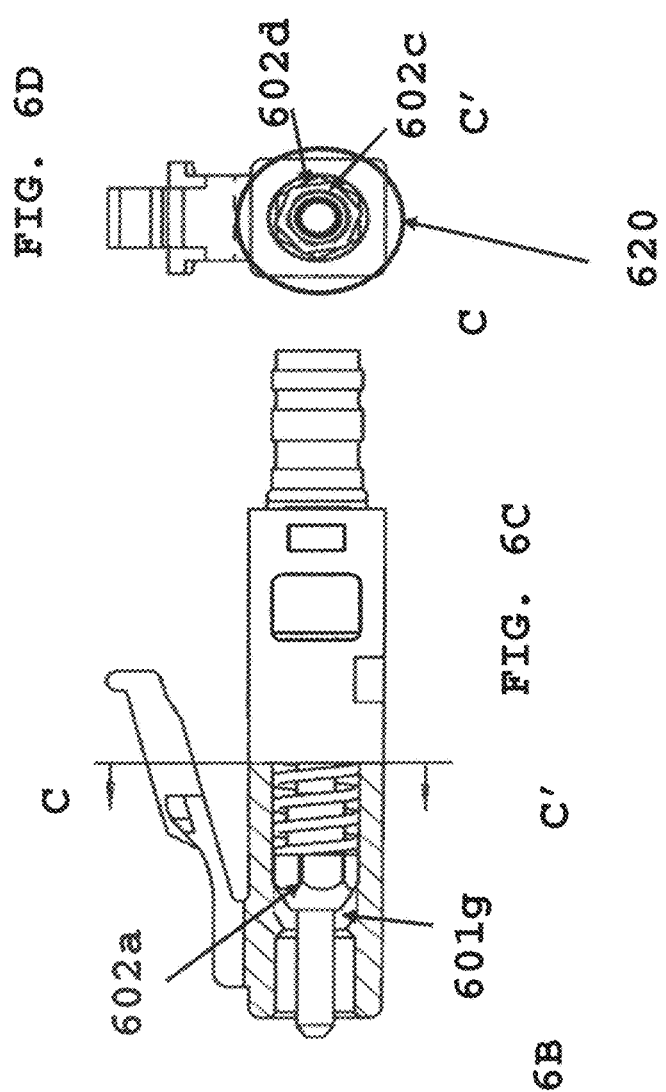
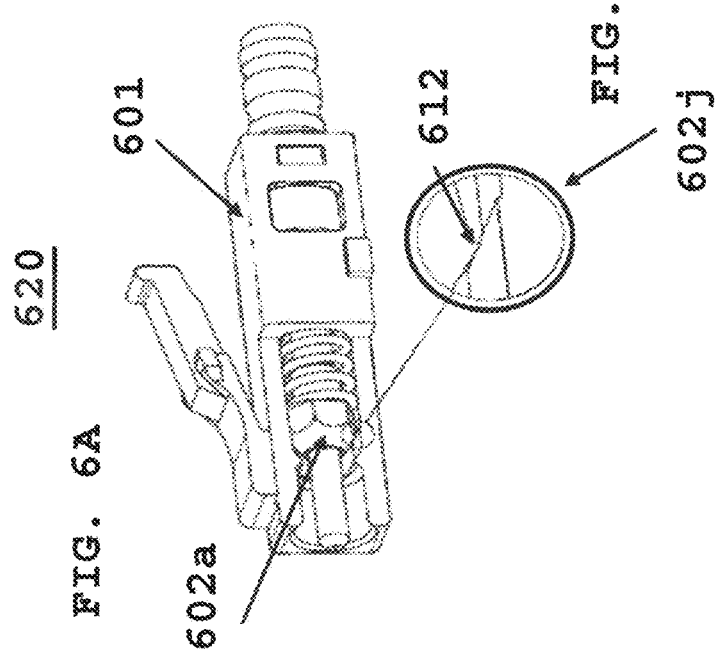

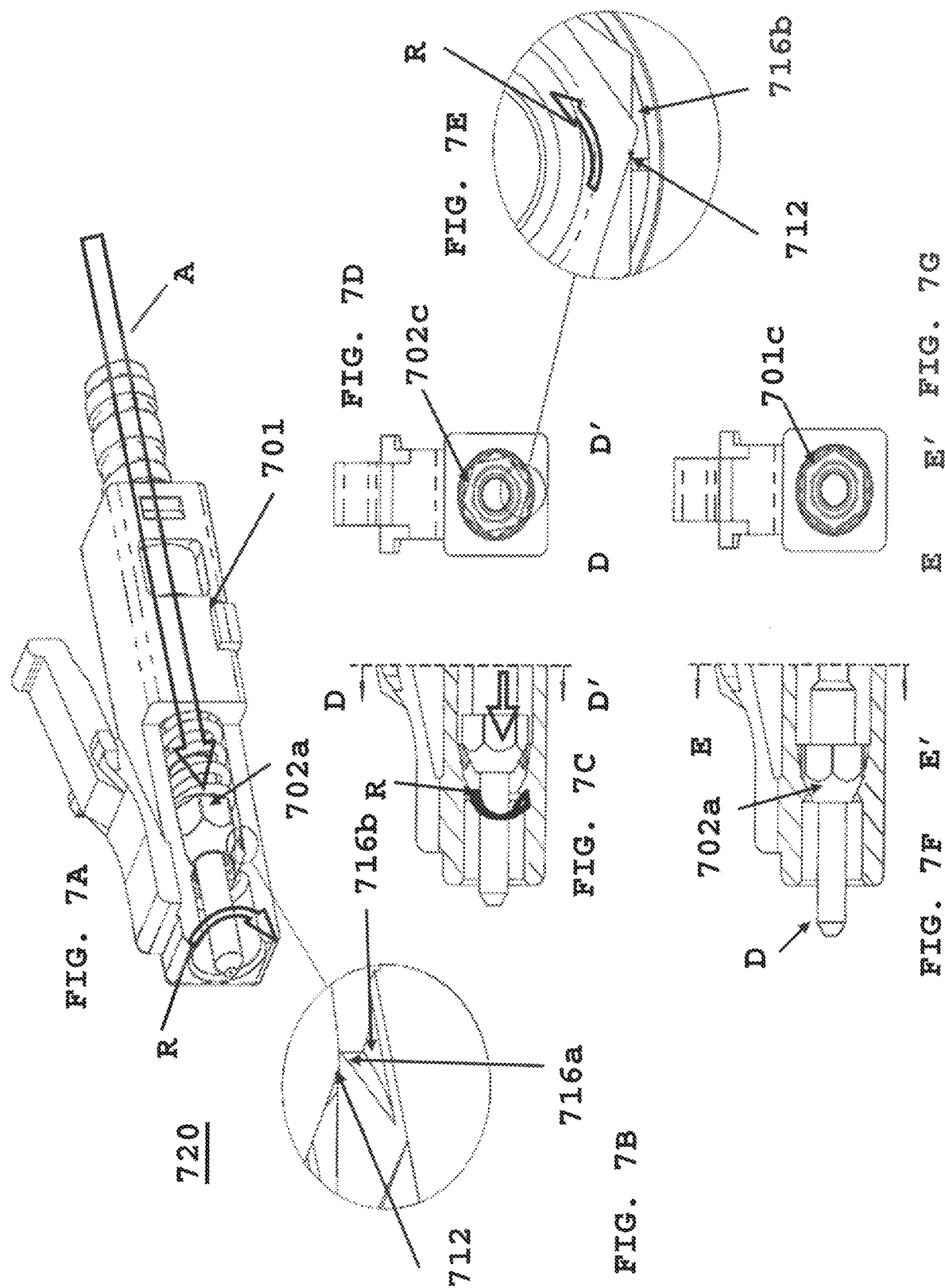

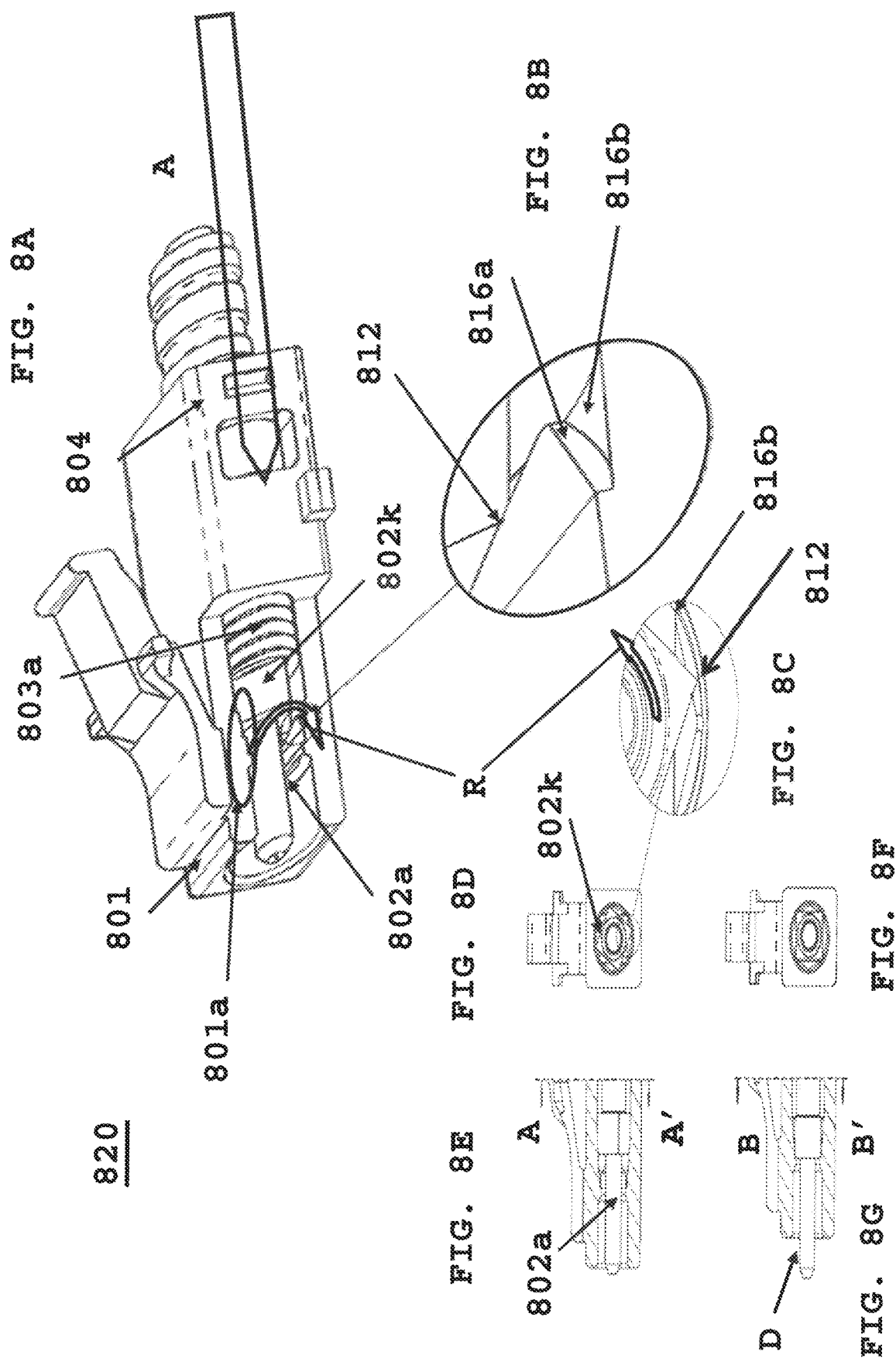

ANTI-JAM ALIGNMENT SLEEVE HOLDER OR CONNECTOR HOUSING FOR A FERRULE ASSEMBLY

PRIORITY CLAIM TO RELATED-APPLICATIONS

This application claims the benefit of priority of U.S. Provisional Application No. 62/546,920 filed Aug. 17, 2017, entitled "Narrow Width Adapters and Connectors with Modular Latching Arm," and U.S. Provisional No. 62/581,961 filed Nov. 6, 2017, entitled "Narrow Width Adapters and Connectors with Modular Latching Arm," each of which is incorporated herein by reference in its entirety.

BACKGROUND

The present disclosure relates generally to fiber optic connectors having at least one ferrule assembly inserted in a housing. The connectors can use the invention, among others, is a Lucent Connector (LC) connector or CS® connector sold by assignee of the present invention.

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, the deployment of high-density interconnect panels has not been fully realized.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing the quality of service.

Small Form Factor Pluggable Transceivers (SFP) are used presently in telecommunication infrastructures within rack mounted copper-to-fiber media converters, and are also known as Ethernet switches and/or patching hubs. These infrastructure Ethernet and fiber optic connections are evolving quickly to increase connection density due to limited space for such equipment. Although fiber optic connectors have become smaller over the years, they have not been designed to be any smaller than necessary to plug into commonly sized and readily available SFPs. However, as transceiver technologies develop, smaller SFPs will be used to create higher density switches and/or patching hub equipment. Accordingly, there is a need for fiber optic connectors that will meet the needs of future developments in smaller SFPs.

SUMMARY

In summary, one aspect provides a connector comprising: a front body comprising: a top and a bottom, a groove running lengthwise on the top of the front body, a recess running widthwise on a surface of the front body, and a rear body detachably connected to the front body forming a housing, wherein a portion of the rear body fits inside the front body when detachably connected; and at least one ferrule assembly inserted into the front body opening configured to receive the ferrule assembly. The ferrule assembly upon insertion may jam when its collar becomes misaligned and stuck in an opening within a front body opening. A cavity in front body opening is configured to match an outer surface of ferrule assembly collar in a CS, LC, SC, or MPO connector. The front body cavity accepting ferrule assembly is sometimes called an alignment sleeve, or has an alignment sleeve inserted into said cavity near a proximal or second end of a connector.

In the present invention, a first end of the alignment sleeve is configured with a plural of lead-ins configured to make contact with ferrule assembly collar outer surface, as ferrule assembly is inserted into its corresponding alignment sleeve. A near edge of one or more lead-ins cause ferrule assembly to rotate under biasing force of its corresponding spring or similar component like a piece of plastic, positioning the collar within cavity while preventing ferrule assembly from becoming jammed between outer collar surface and inner alignment sleeve surface within cavity, thus accepting and aligning ferrule assembly within connector housing. The angle and depth of a lead-in depends on the number of collar sides on outer surface thereof. A hex-sided collar outer surface requires a greater distance between lead-in edges than an eight sided collar outer surface. A more acute angle collar surface requires less lead-ins. Other variations can be used.

For a CS connector 100, ferrule assembly (102a, 102b) may become misaligned or stuck in alignment sleeve holder 204 of FIG. 2B. This would over compress bias spring (103a, 103b) leading to component failure. More importantly, ferrule with fiber strand would not be forward enough inside connector front body 101 to meet a required distance between fiber strand and opposing fiber strand (e.g. another connector fiber strand or transceiver electronics). Failure to meet required separation distance between two opposing fiber strands increases signal loss. Connector 100, FIG. 1, is assembled in direction of arrow "A". Connector housing 101 accepts one or more ferrule assembly (102a, 102b) (for example a MPO connector has a single ferrule assembly at FIG. 1C). At a distal end of each ferrule assembly is positioned a bias spring (103a, 103b), and placed over springs and ferrule assembly is back body 104 that compresses springs that push forward ferrule assembly into outer housing, and back body 104 is secured when latch (106a, 106b) snaps into corresponding opening (107a, 107b). As known in the prior art, ferrule assembly has a fiber strand encased by a ceramic body. It is this fiber strand that carries the signal. If the ferrules are not forward enough then signal loss occurs by becoming jammed within alignment sleeve (204). The present invention overcomes this failure typically called insertion loss.

In the present invention, ferrule collar (102c, 102e) meets a plural of lead-ins (416), (refer to FIG. 4), at a first end of a corresponding alignment sleeve 204. Lead-ins 416 cause ferrule assembly (102a, 102b) to rotate under the force of springs (103a, 103b) until the outer surface of the ferrule assembly (102c, 102e) or ferrule collar engages or comes to rest within opening (416a) between the lead-ins (refer to FIG. 4B). At this point ferrule assembly is aligned with its corresponding alignment sleeve, and the fiber strand is at a distance from an opposing receiver according to industry specification for minimizing insertion or signal loss.

BRIEF DESCRIPTION OF THE DRAWINGS

FIG. 2A is a perspective view of a CS connector front body with a cut-away view illustration alignment sleeve;

FIG. 2B is a zoomed view of FIG. 2A cut-away;

FIG. 2C is a cross-section view of an alignment sleeve or channel of front body of FIG. 2A;

FIG. 3A is a cut-away view of alignment sleeve with a ferrule assembly improperly inserted therein;

FIG. 3B is a zoomed view of FIG. 3A;

FIG. 3C depicts a view along cut B-B' of FIG. 3A;

FIG. 3D is a view along cut B-B' showing misalignment of ferrule collar within alignment sleeve;

FIG. 4A is a perspective view with a cut-away showing the present invention configured within alignment sleeve of a CS connector;

FIG. 4B is a zoomed view of cut-away of FIG. 4A;

FIG. 5A is a perspective view with a cut-away showing present invention configured as ferrule assembly is being inserted into alignment sleeve of a CS connector;

FIG. 5B is a zoomed view of FIG. 5A cut-away;

FIG. 5C is a zoomed view of collar outer surface in contact with lead-in of the present invention;

FIG. 5D is a front perspective view of ferrule collar outer surface engaging lead-in as ferrule assembly is inserted into a first end of alignment sleeve;

FIG. 5E is a zoomed view of FIG. 5B as ferrule assembly is further inserted into alignment sleeve; ferrule assembly rotates in direction of "R" of FIG. 5B as bias spring forces ferrule assembly in direction "R";

FIG. 5F is a front perspective view of ferrule collar just prior to collar surface contact point engaging lead-in within alignment sleeve at a first end;

FIG. 6A is a perspective view of prior art LC connector with ferrule assembly improperly inserted into alignment sleeve holder;

FIG. 6B is a zoomed view of contact point of collar outer surface misaligned within a plug frame;

FIG. 6C is a cut-away view of a ferrule assembly within a plug frame of LC connector up to line C-C';

FIG. 6D is a front view along C-C' showing ferrule assembly misaligned within plug frame of LC connector;

FIG. 7A is a perspective view of LC connector initially misaligned ferrule assembly;

FIG. 7B is a zoomed view of ferrule assembly initially misaligned of FIG. 7A;

FIG. 7C is a cross-section view of ferrule assembly as it rotates in direction "R" under the force of bias member for proper alignment according to the present invention;

FIG. 7D is a front view of ferrule assembly approaching alignment or proper orientation within alignment sleeve of connector plug frame along line D-D' of FIG. 7C;

FIG. 7E is a zoomed view of FIG. 7D as contact point rotates into proper alignment according to the present invention;

FIG. 7F is a side cut away view of a properly inserted and aligned ferrule assembly;

FIG. 7G is a zoomed view of a properly inserted aligned ferrule assembly along line E-E' of FIG. 7F;

FIG. 8A is a perspective view of square flange plug frame, or SC connector, with ferrule assembly being inserted in direction "A", and rotating in direction "R", as ferrule is inserted;

FIG. 8B is a zoomed view of ferrule collar contact point, during rotation, and prior to orienting via lead-in according to the present invention;

FIG. 8C is a zoomed view of rotation, "R", prior to ferrule collar contact point just prior to orienting via lead-in;

FIG. 8D is a front view of FIG. 8C of initially misaligned ferrule assembly within channel or cavity of SC connector or plug frame, which acts as an outer housing along line A-A' of FIG. 8E;

FIG. 8E is a side view cut-away of ferrule assembly initially misaligned in channel or alignment sleeve of SC connector;

FIG. 8F is a front view of aligned ferrule assembly after proper rotation, "R", along line B-B' of FIG. 8G;

FIG. 8G is a side view cut-away of after complete rotation, "R", where ferrule assembly is aligned within SC plug frame.

DETAILED DESCRIPTION

Figure 1A:
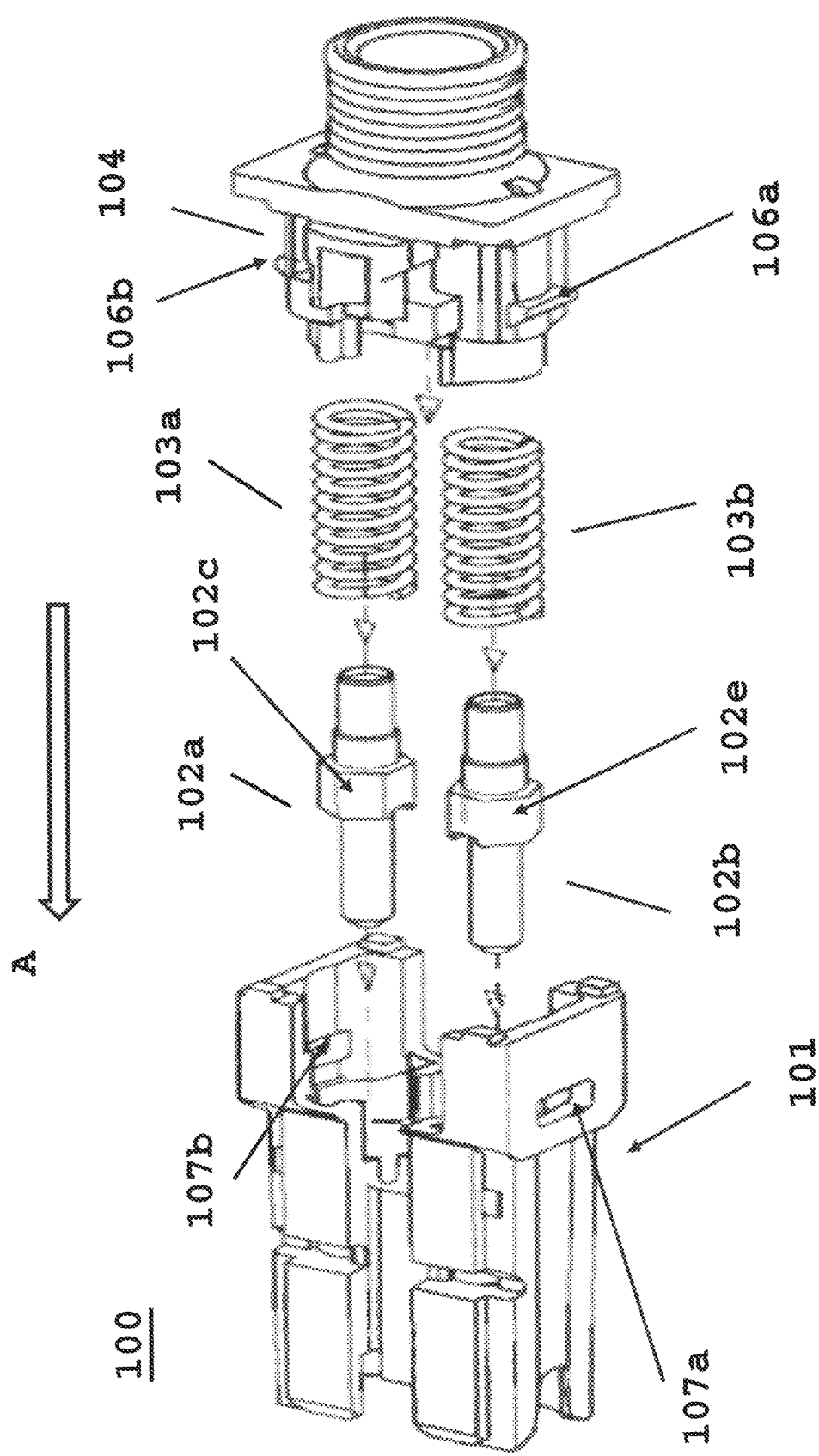
FIG. 1A is an exploded view of a CS® connector prior to insertion of a plural of ferrule assembly within a front body.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or component thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a remote release mechanism such that a user can remove cable assembly connectors that are closely spaced together on a high-density panel without damaging surrounding connectors, accidentally disconnecting surrounding connectors, disrupting transmissions through surrounding connectors, and/or the like. Various embodiments also provide narrow pitch LC duplex connectors and narrow width multi-fiber connectors, for use; for example, with future narrow pitch LC SFPs and future narrow width SFPs. The remote release mechanisms allow use of the narrow pitch LC duplex connectors and narrow width multi-fiber connectors in dense arrays of narrow pitch LC SFPs and narrow width multi-fiber SFPs.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

FIG. 1A depicts a CS® connector, as disclosed in related provisional applications referenced here. Front body 101 accepts at least one ferrule assembly (102a, 102b), a corresponding ferrule bias spring (103a, 103b) and a back body 104. The back body 104 has a pair of opposing latches (106a, 106b) that snap into corresponding opening (107a, 107b), which compresses bias springs that pushes its corresponding ferrule assembly forward. As discussed above, in a prior art connector the ferrule assembly could become jammed if misaligned upon insertion of said assembly.

Figure 1B:
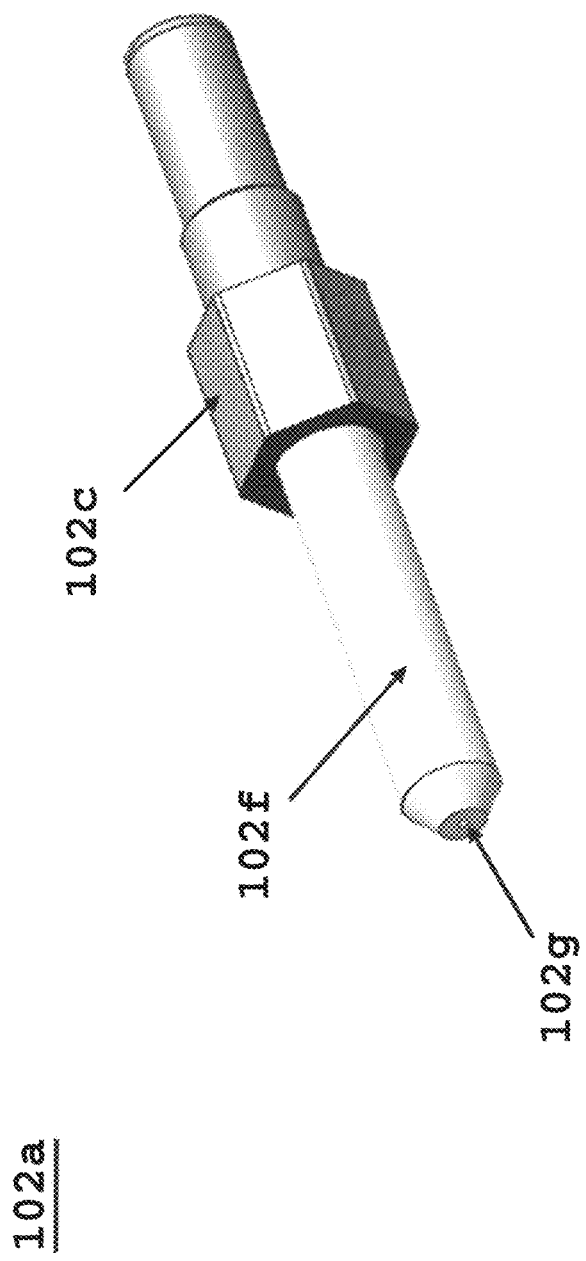
FIG. 1B is a perspective view of a ferrule assembly for a LC or CS connector.

FIG. 1B depicts ferrule assembly 102a. Ferrule assembly 102a has a fiber strand 102g surrounded by a ceramic carrier 102f, and a collar 102c. Collar 102c is accepted within a cavity or alignment sleeve of a front body 101.

FIG. 2A depicts a CS connector front body 201, according to the present invention. FIG. 2B depicts front body cavity or channel which is known in the art as an alignment sleeve 204. The cavity 204a accepts a proximal end of a ferrule assembly (102a, 102b). FIG. 2A housing 201 has an inner surface 204 with a plural of surfaces that correspond to outer surface or collar 102c of ferrule assembly 102a. As ferrule 102a is inserted under the force of its corresponding bias spring 103a, ferrule assembly may become misaligned or stuck within surfaces 204a (refer to FIG. 2B). FIG. 2C depicts being "stuck" or "jammed" as ferrule assembly 102a is not fully inserted into cavity 204a, which means its corresponding fiber strand is short, in terms of distance, "D", from an opposing fiber strand or transceiver receiver, and signal loss occurs that is greater than industry standard.

FIG. 3A depicts a CS connector front body 301 with ferrule assembly 102a jammed within front body cavity 301d (refer to FIG. 3B). FIG. 3B depicts a zoomed view of ferrule assembly 102a misaligned within housing cavity or alignment sleeve. FIG. 3C depicts a cross-section along line B-B' of ferrule assembly 102a misaligned in cavity of front body 201, as shown in FIG. 3D. FIG. 3C depicts outer surface of ferrule assembly 102c, or collar 102c misaligned within alignment sleeve 102d. "D" shows ferrule 102f does not extend beyond opening of outer housing 301, which means ferrule assembly 102a is jammed within housing cavity.

Figure 1C:
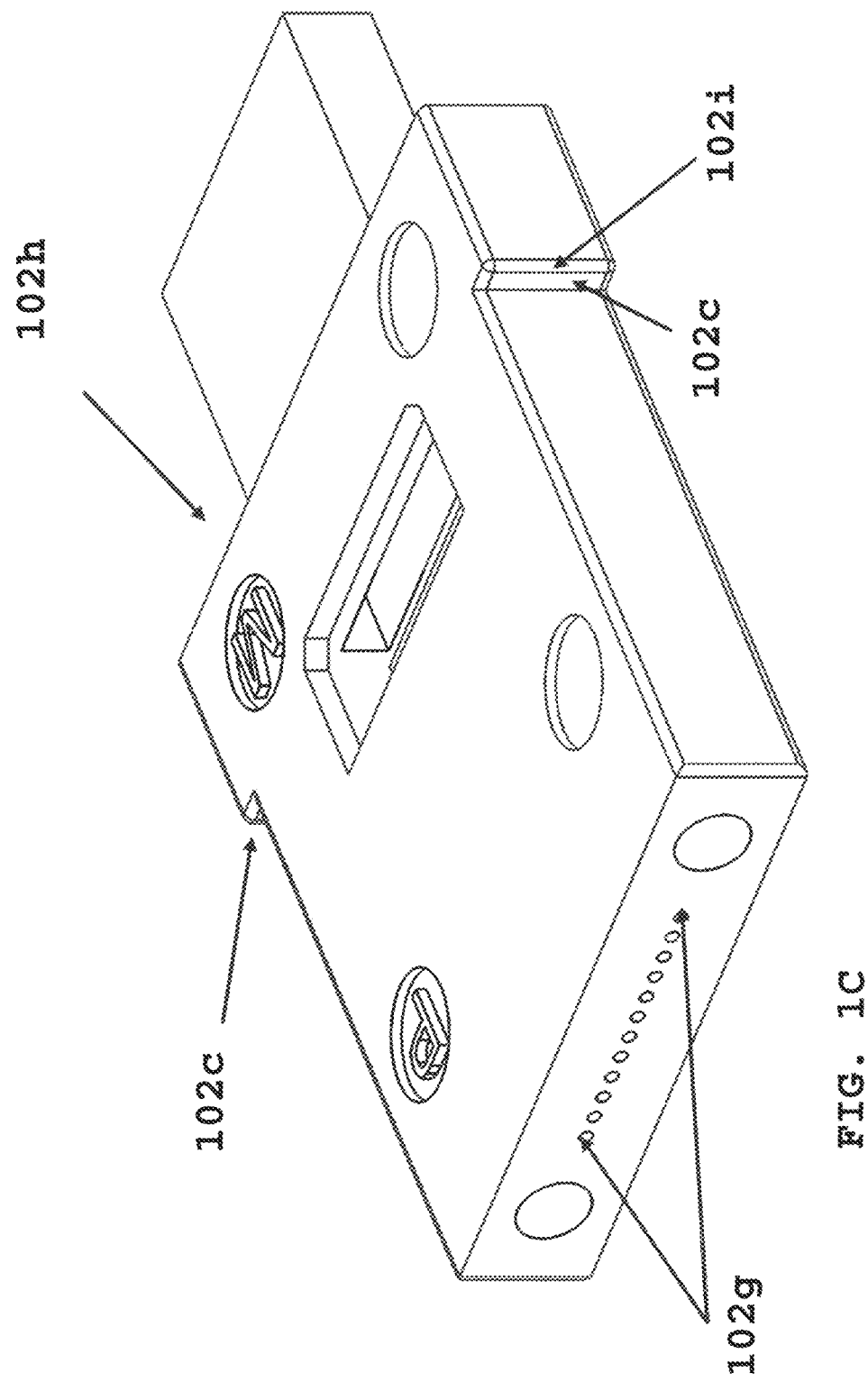
FIG. 1C is a perspective view of a MPO ferrule assembly.

FIG. 4A depicts front body 401 with cut-away 410. Cut-away 410 illustrates a plural of lead-ins 416. As shown in FIG. 4B, lead-ins 416 form anti-jam feature of the present invention. As depicted in FIG. 4B, lead-ins are molded as part of the alignment sleeve 102d, further reducing cost and ensuring inter-operability. The latter is important because ferrule assembly design is a long-time industry standard that cannot be changed. This invention substantially reduces ferrule assembly jamming and its associated production loss and failures in the field or outside plant. Lead-ins 416 can be triangular in shape with a varying draft angle 416a and varying opening 416b. The angle 416a or opening 416b is varied to accommodate collar surface of ferrule assembly 102a. FIG. 1C depicts a MPO or multi-fiber 102g push on ferrule assembly 102h with a cut-out collar 102c. Collar 102d has a radius that engages with lead-ins 416 upon insertion into a connector body (not shown).

FIG. 5A depicts CS® front body 501 with a cut-away view of cavity properly holding ferrule assembly 502a. Note ferrule 102f is distance "D" out of housing 501. FIG. 5B depicts insertion of assembly 502a toward a first end in direction of arrow "A". As assembly 502a is inserted, a contact point 512 rotates in direction R, (opposite direction rotation may occur depending on draft angle of lead-in as depicted in FIG. 8B for left-hand rotation). FIG. 5C depicts a front view of ferrule assembly rotation, R, as contact point 512 begins to engage lead-in 516 at lead-in draft angle 516a, as shown in FIG. 5D. FIG. 5E depicts further rotation, R, and further illustrates that ferrule assembly 502a is becoming aligned. Here as draft angle 516a makes contact with collar 502c, and draft angle 516a guides ferrule assembly into proper orientation, as shown in FIG. 5F. FIG. 5E depicts contact point 512 (and collar 502c as shown in FIG. 5F), has not jammed or is becoming properly oriented as ferrule assembly is inserted in arrow direction "I". FIG. 5F depicts ferrule assembly collar 502c properly oriented within lead-in 516a openings 516b.

FIG. 6A depicts prior art LC connector 620 using anti-jam, anti-stuck feature of the present invention. Ferrule assembly 602a is inserted in a jammed condition within plug frame 601. Plug frame 601 has a cavity that accepts ferrule assembly 602a. FIG. 6B is a zoomed view 602j, of ferrule assembly 602a jammed within cavity of plug frame. In FIG. 6B, contact point 612 is stuck at a portion of cavity wall. FIG. 6C depicts a view along C-C' (refer to FIG. 6O) and shows ferrule assembly 602a has not been fully inserted, illustrated by gap 601g. FIG. 6D depicts, front view of LC connector 620 where ferrule collar 602c is off-set or jammed within cavity or alignment sleeve holder 602d, of LC plug frame 601.

FIG. 7A depicts a prior art LC (UPC plug frame) connector 720 with ferrule assembly 702a being inserted within plug frame 701 in direction of arrow "A" containing the present invention (refer to FIG. 7B). FIG. 7B depicts triangular protrusion 716a and contact point 712 as ferrule assembly 702a is inserted into cavity of housing 701. FIG. 7C depicts further insertion and rotation "R" of ferrule assembly 702a. FIG. 7D depicts view along line D'-D' of FIG. 7C, as ferrule assembly collar 702c rotates along surface of anti-stuck feature, as depicted in zoomed view thereof in FIG. 7E. Contact point 712 enters opening 716b, which helps ensure that contact point 712 does not become jammed against a surface within alignment sleeve or cavity of connector body. FIG. 7F depicts a cut-away of a properly inserted ferrule assembly 702a as shown by ferrule 102f extending a pre-determined distance "D" out of connector housing 701. FIG. 7G depicts an end view of ferrule assembly 702 properly inserted into connector housing 701, as can be seen there is not misalignment between ferrule collar 702c and alignment sleeve or inner cavity of housing 701.

FIG. 8A depicts a square flange APC plug frame or SC connector 800. Ferrule assembly 802a has a square collar 802k or flange as compared with collar 102c, for a LC connector which is circular. Alignment sleeve 801a or inner cavity structure is stepped instead of triangular as in a LC connector housing 701. Ferrule assembly 802a is inserted in direction of arrow "A" from a distal or cable end of connector 820. FIG. 8B depicts contact point 812 rotating as back body compresses bias spring 803a. For SC connector 820 back body 804 and housing 801 are an integrated one-piece design. FIG. 8B depicts contact point 812 of flange/collar 892k as it rotates, "R" along angled surface before coming to rest aligned within opening 816b of the present invention, which avoids jamming of ferrule assembly 802a within cavity of housing 801. FIG. 8C depicts contact point 812 approaching opening 816b as ferrule assembly 802a rotates "R". FIG. 8D illustrates ferrule assembly 802a off-set or approaching alignment, that is its collar 802k, rotates "R" under force of bias spring 803, and aligns with openings 816b. FIG. 8E depicts end view of FIG. 8D along line A-A', as ferrule assembly 802a is approximately 50% inserted into housing 801. FIG. 8F depicts end view of FIG. 8G, of fully inserted ferrule assembly 802a that is not jammed, as further illustrated by ferrule extending distance "D" from housing 801 at proximal end of connector 820.

What is claimed is:

1. A connector housing having a distal end and a proximal end spaced from the distal end in a proximal direction along an axis, the connector housing comprising:
    an inner cavity structure to accept a ferrule assembly, wherein the ferrule assembly comprises a collar having a plurality of contact points at a proximal end of the collar;
    an alignment sleeve extending along the axis, the alignment sleeve comprising a plurality of angled surfaces circumferentially spaced about the axis and a plurality of openings interleaved between the plurality of angled surfaces about the axis, each of the angled surfaces facing radially inwardly toward the axis, each opening extending longitudinally along the axis away from the angled surfaces in the proximal direction, each angled surface sloping radially inwardly with respect to the axis and toward a respective one of the openings as it extends along the axis in the proximal direction,
    the angled surfaces and openings are molded as part of the inner cavity structure;
    a bias spring engaging a distal end of the collar opposite the contact points;
    a backbody inserted at the distal end of the housing capturing the bias spring between the backbody and the distal end of the collar,
    the backbody compresses the bias spring to create a spring force,
    the spring force created by the compressed spring rotates each of the contact points of the collar along the corresponding angled surface until the contact points are received within the corresponding opening thereby securing the ferrule assembly within the alignment sleeve without jamming the ferrule assembly within the alignment sleeve.

2. The connector housing according to claim 1 wherein the angled surface is oriented at an angle of about 10 degrees to 45 degrees with respect to the axis.

3. The connector housing according to claim 1, wherein the connector housing is selected from a LC, SC, MPO or CS connector housing.

4. The connector housing according to claim 1, wherein the collar is annular.

5. The connector housing according to claim 1, wherein the collar is square.

6. The connector housing resulting in the configuration of claim 1.

7. A method of assembling the connector comprising:
    providing the connector housing for claim 6;
    inserting the ferrule assembly into the cavity of the connector housing;
    inserting the bias spring at the distal end of the ferrule assembly;
    securing the backbody to the distal end of the connector housing; and
    wherein inserting the backbody compressing the spring results in rotating the ferrule assembly within the cavity without jamming the ferrule assembly within the cavity.

8. A connector housing comprising a body defining an alignment sleeve extending along an axis, the alignment sleeve being configured to receive a ferrule assembly including a flange having a plurality of sides, the alignment sleeve comprising a ferrule guide portion and a ferrule receiver portion extending longitudinally away from the ferrule guide portion in a first axial direction, the ferrule receiver portion having a plurality of longitudinally extending sides defining a flange recess sized and arranged to matingly receive the flange of the ferrule, the plurality of longitudinally extending sides comprising a first longitudinally extending side and a second longitudinally extending side that meet at a vertex extending longitudinally along the axis, the ferrule guide portion having at least one angled guide surface facing radially inwardly toward the axis and extending longitudinally along the axis, the at least one angled guide surface sloping radially inwardly with respect to the axis and toward the vertex as it extends in the first axial direction for engaging the flange of the ferrule as the ferrule moves in the first axial direction to orient the ferrule for mating reception in the flange recess.

* * * * *